March 15, 1949.  K. H. RECKER  2,464,529
PROCESS OF WAX-COATING PRODUCE
Original Filed Jan. 31, 1945  3 Sheets-Sheet 1
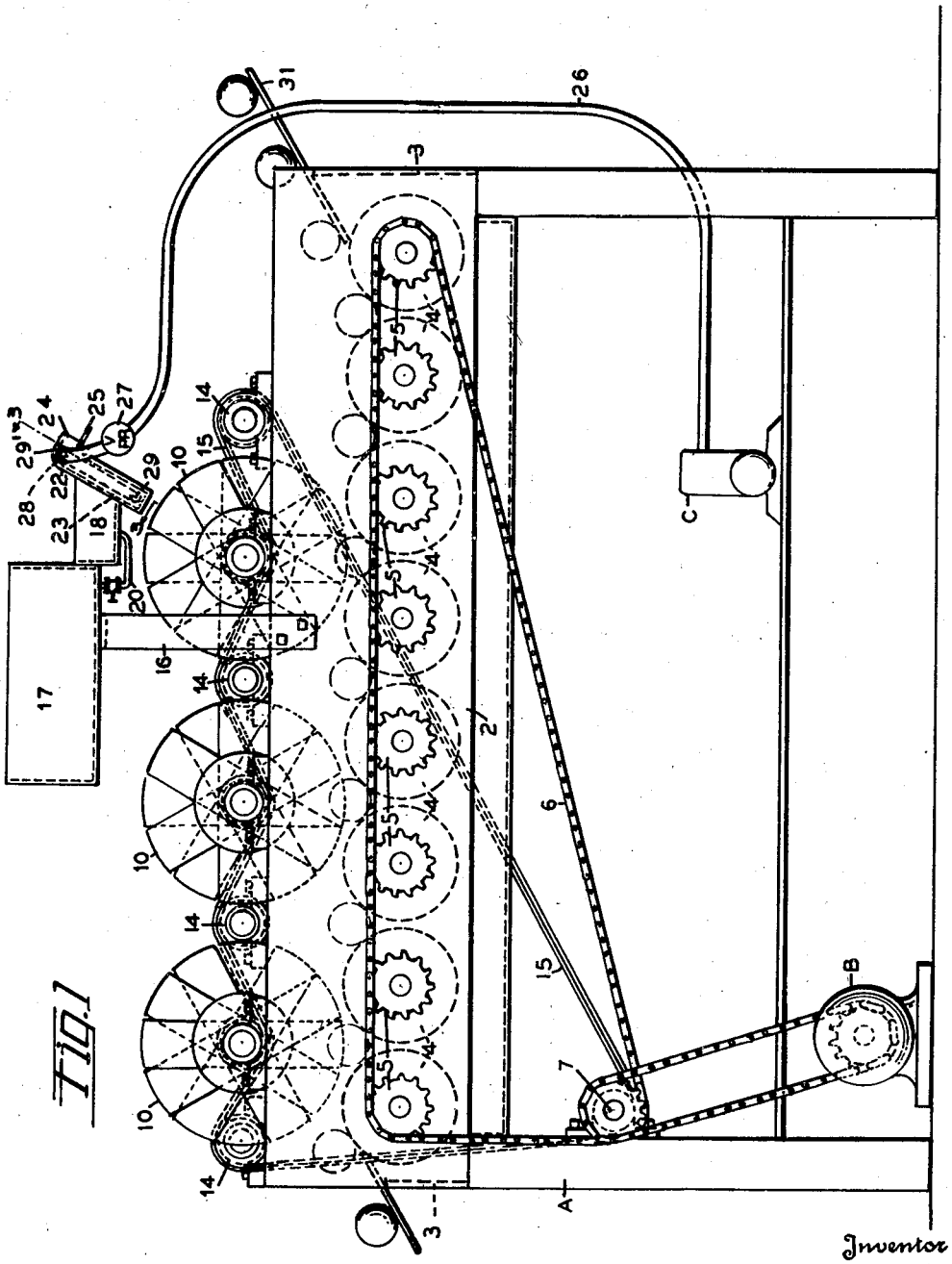
Inventor
KENNETH HOVER RECKER
By Robert J. Leahy

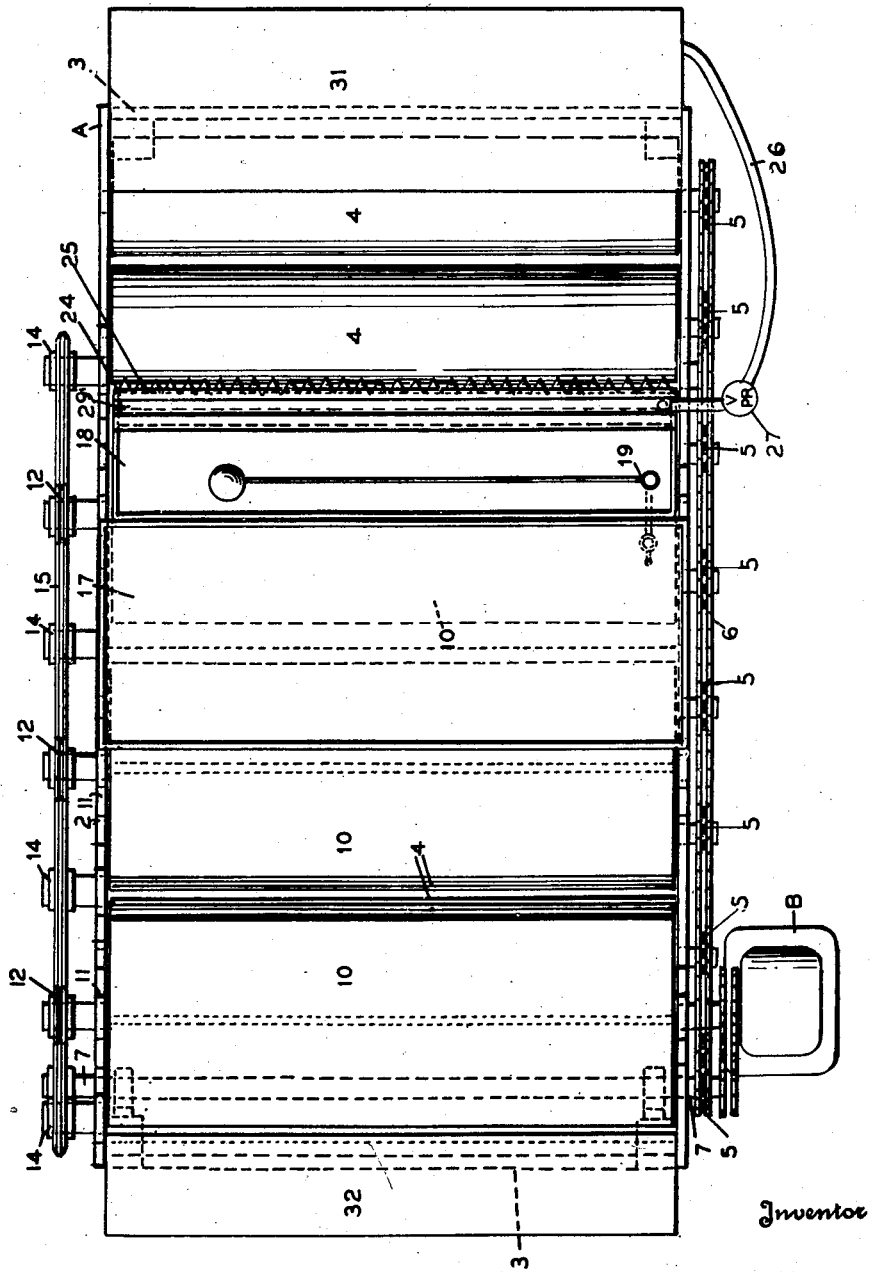

March 15, 1949.    K. H. RECKER    2,464,529
PROCESS OF WAX-COATING PRODUCE
Original Filed Jan. 31, 1945    3 Sheets—Sheet 3
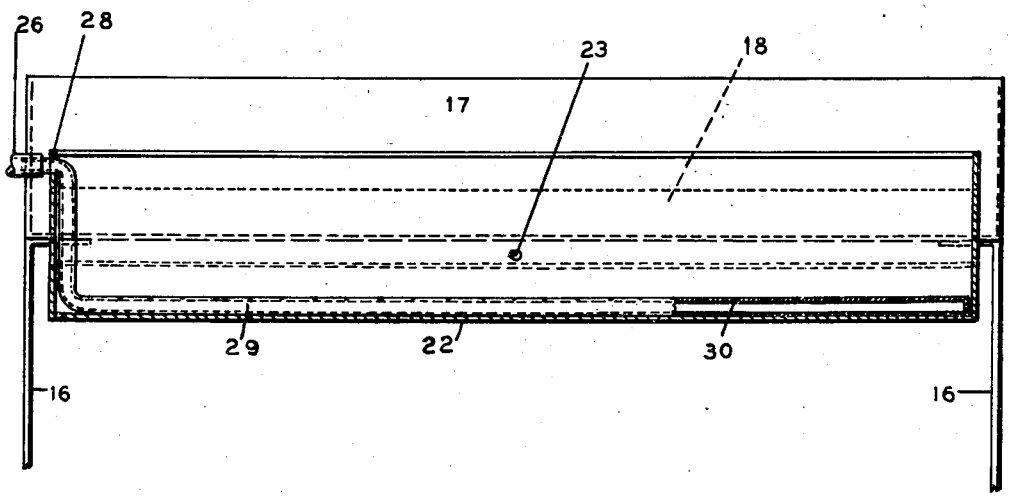
Inventor
KENNETH HOVER RECKER
By Robert J. Leahy Patented Mar. 15, 1949

2,464,529

UNITED STATES PATENT OFFICE 2,464,529

PROCESS OF WAX-COATING PRODUCE

Kenneth Hover Recker, Winter Haven, Fla.

Original application January 31, 1945, Serial No. 575,527. Divided and this application August 19, 1947, Serial No. 769,432

5 Claims. (Cl. 99—168)

1

This invention is concerned with the provision of a waxing apparatus by means of which various kinds of produce may be waxed without the use of excessive moisture.

Since the first use of water emulsion wax on produce, such as the various kinds of fruits and vegetables, it has been realized that the normal methods of application, such as dipping, spraying, and drenching, had definite limitations. These methods have proven to be very unsatisfactory because of bulky equipment being required, and such methods cause a spread of wax over the equipment, and packers and graders are required to wear gloves which likewise have to be continually changed due to excessive wax accumulation thereon. Secondly, due to excessive moisture, drying actually occurs after the produce is placed in shipping containers, this causes spots of wax to appear on the produce which is unsightly and reflects on the price obtained for same; furthermore, such methods do not permit mechanical polishing of the produce without first placing same in expensive driers. Therefore, the primary object of this invention is to provide an apparatus whereby a wax emulsion with a low moisture content may be applied to the produce, allowing for a greater concentration of solids on the produce, and to provide means for feeding the emulsion in small quantities and the provision of a series of wipers which evenly coat the produce with a thin film of wax which quickly dries, thereby, permitting the produce to be packed in shipping containers dry or if desired polished without the use of extensive drying mechanism.

This invention resides substantially in the combination, construction, arrangement and relative location of parts, all in accordance with the disclosure herein.

In the accompanying drawings:

Figure 1 is a side elevation of an apparatus embodying this invention.

Figure 2 is a plan view thereof.

Figure 3 is an enlarged section on the line 3—3, Figure 1.

The true nature and manner of use of an apparatus in accordance with this invention will be best understood by a detailed description of the form thereof shown in the drawings in an illustrative sense.

This apparatus includes a conventional transverse roller table A having side and end frame members 2 and 3 respectively, the transverse rollers 4 thereof having journal bearings in said side members, and being rotatable counter-

2 clockwise thru means of sprockets 5, which are engaged with the rollers for rotation thereof, and sprocket chain 6 which conveys movement to the sprockets 5 from the prime mover B thru a driver sprocket mounted on a power shaft 7 for rotation thereof, said power shaft being driven by the prime mover B thru means of sprocket mechanism.

Likewise, transverse to said roller table A are a series of rag rollers 10 the journals of which are in bearing with bearings 11 which are mounted upon the upper edge of side members 2 and which are rotatable clockwise thru means of driven pulleys 12 engaged with said rollers for rotation thereof, idlers 14 and a belt 15 which is in engagement with the prime mover B thru a driven pulley mounted upon the power shaft 7 for rotation thereof.

For waxing efficiency it is desirable that the R. P. M. of the rag rollers be higher than that of the table rollers, as for example—100 R. P. M. for the table rollers to 200 R. P. M. for the rag rollers.

Supported by bracket members 16 above said rag rollers 10 is reservoir 17 adjacent which is an auxiliary tank 18 having a ball cock 19, the plane of said auxiliary tank being lower than the reservoir to provide for gravity flow from the reservoir to the auxiliary tank. In the use of this apparatus the reservoir is filled manually, or thru other suitable means with a wax emulsion which flows therefrom by gravity to the auxiliary tank thru a valve controlled pipe line 20 to a level in the auxiliary tank, controlled by adjustment of the ball cock 19, thence the emulsion flows into an agitator vessel 22; set on an angle to the vertical plane of the auxiliary tank, which is oblong in cross section and the inner wall of which forms the outer wall of the auxiliary tank; thru an aperture 23. This waxing process calls for the agitation of the wax emulsion to create a foam which rises in the agitator vessel and overflows thru the downwardly projected neck portion 24 thereof and distributes along the angular toothed bottom edge 25 of said neck portion to provide an even gradual dropping of the wax rather than an uneven bulk drop. While agitation to this end may be accomplished within the vessel by mechanical means such as paddle or beater mechanism, or by emulsion fed under pressure to the emulsion in the vessel, my preferred means is by compressed air from a compressor C fed by hose or pipe connection 26 having a pressure relief valve 27 to a right angular pipe member 28 the lateral portion 29 of which rests on the bottom of the agitator vessel and has minute apertures 30 for air escape.

This arrangement of the pipe member 28 allows for removal from or replacement to the agitator vessel thru the longitudinal slot 29', at the top of the vessel, which is essential for cleaning purpose.

The operation of the apparatus is a continuous one. The produce is delivered over a chute board 31 to the table rollers 4 and thence urged forward by said rollers for delivery over a chute board 32. During this travel, as the produce approaches the first rag roller it is contacted with minute droppings of wax from the agitator vessel, from thereon, as the produce travels thru the path of said rag rollers these droppings are evenly spread over the produce by the rollers, said rollers absorbing any surplus wax. It is quite obvious that aside from wiping the produce, the rag rollers also aid in urging the produce forward.

From the above description it will be apparent to those skilled in the art that the details of construction illustrated herein may readily be varied without departure from the novel subject matter herein disclosed. I do not, therefore, desire to be strictly limited by the disclosure, but rather by the claims granted me.

This application is a division of my co-pending application Serial Number 575,527 filed January 31, 1945, now Patent No. 2,430,187, issued November 4, 1947.

I claim:

1. A process of wax coating produce comprising treating the produce with an aqueous wax emulsion foam and wiping said treated produce.

2. A process of wax coating produce comprising agitating an aqueous wax emulsion of low moisture content sufficiently to foam, applying the foam to produce, and wiping said coated produce.

3. In a process of wax coating produce wherein the produce is coated with a water emulsion of wax, and wiped, the improvement comprising the steps of agitating a wax emulsion of low moisture content sufficient to form a foam, and applying the foam to the produce.

4. A process of wax coating produce comprising applying an aqueous wax emulsion foam to the surface of produce and causing said foam to form a wax coating thereover.

5. A process of wax coating produce comprising applying an aqueous wax emulsion foam upon the surface of produce and distributing said foam thereover.

KENNETH HOVER RECKER.

REFERENCES CITED

The following references are of record in the file of this patent:

UNITED STATES PATENTS

| Number | Name | Date |
|---|---|---|
| 1,700,908 | Ricketts | Feb. 5, 1929 |
| 2,019,758 | McRill | Nov. 5, 1935 |
| 2,042,857 | Nelson | June 2, 1936 |
| 2,046,537 | Thompson | July 7, 1936 |
| 2,412,686 | Kalmar | Dec. 17, 1946 |